(12) United States Patent
Huang (10) Patent No.: US 12,420,327 B2
(45) Date of Patent: Sep. 23, 2025

(54) JOINT STRUCTURE FOR GROOVE-SHAPED MEMBERS AND JOINING METHOD FOR GROOVE-SHAPED MEMBERS

(71) Applicant: MATSUMOTO INDUSTRY CO., LTD., Fukuoka (JP)

(72) Inventor: Hao Huang, Fukuoka (JP)

(73) Assignee: MATSUMOTO INDUSTRY CO., LTD., Fukuoka (JP)

( * ) Notice: Subject to any disclaimer, the term of this patent is extended or adjusted under 35 U.S.C. 154(b) by 0 days.

(21) Appl. No.: 18/844,528

(22) PCT Filed: Mar. 4, 2023

(86) PCT No.: PCT/JP2023/008196
§ 371 (c)(1),
(2) Date: Sep. 6, 2024

(87) PCT Pub. No.: WO2023/171586
PCT Pub. Date: Sep. 14, 2023

(65) Prior Publication Data
US 2025/0196217 A1     Jun. 19, 2025

(30) Foreign Application Priority Data

Mar. 7, 2022   (JP) .................... 2022-034028

(51) Int. Cl.
*B21D 39/03*      (2006.01)
*B21D 19/08*      (2006.01)

(52) U.S. Cl.
CPC ............. *B21D 39/03* (2013.01); *B21D 19/08* (2013.01)

(58) Field of Classification Search
CPC ........ B21D 39/03; B21D 19/08; B21D 31/06; B21D 39/026; B29C 53/34; B29C 66/723; B29C 66/742
See application file for complete search history.

(56) References Cited

FOREIGN PATENT DOCUMENTS

| EP | 2733051 A1 * | 5/2014 | ............ B62D 25/02 |
|----|---|---|---|
| JP | S61-59301 U | 4/1986 | |

(Continued)

OTHER PUBLICATIONS

International Search Report issued on May 16, 2023 for PCT/JP2023/008196.

*Primary Examiner* — Lee A Holly
(74) *Attorney, Agent, or Firm* — Rankin, Hill & Clark LLP (57) ABSTRACT

Thermal strain due to welding occurs when long materials having a U-shaped cross section are joined together. The joining work is complicated. To an end portion of a first groove-shaped member having a shape in which side surface portions rise from both ends of a bottom surface portion, that is, a substantially U-shaped cross section, an end portion opposing thereto of a second groove-shaped member having the same shape is fitted. Their bottom surface portions and their side surface portions are kept in close contact with each other. A bottom surface clinched portion is formed on the bottom surface portions in the fitted portions by spot clinching. A pair of edge folding portions are formed on each of the pairs of the side surface portions by hemming bending. Furthermore, a side surface clinched portion is formed on each of the edge folding portions by spot clinching. These three kinds of processing are performed in a single processing step of metal dies. The joining strength is increased and occurrence of thermal strain is eliminated, and efficient joining work can be performed.

6 Claims, 7 Drawing Sheets

(56) References Cited

FOREIGN PATENT DOCUMENTS

| | | |
|---|---|---|
| JP | H05-58341 A | 3/1993 |
| JP | H11-81581 A | 3/1999 |
| JP | 200575018 A | 3/2005 |
| JP | 2005-088077 A | 4/2005 |
| JP | 2005127676 A | 5/2005 |
| JP | 2008-296246 A | 12/2008 |
| JP | 2013046930 A | 3/2013 |
| KR | 20180072391 A | 6/2018 |

* cited by examiner

JOINT STRUCTURE FOR GROOVE-SHAPED MEMBERS AND JOINING METHOD FOR GROOVE-SHAPED MEMBERS

TECHNICAL FIELD

The present invention relates to a joint structure for groove-shaped members in which end portions of a pair of groove-shaped members having a predetermined length and a substantially U-shaped cross section are fitted to each other and joined and a joining method for the same.

BACKGROUND ART

Long plate materials having a U-shaped cross section are used in various kinds of products and parts, for example, as strength members.

For example, a U-shaped cross-sectional groove-shaped member is used in a seat frame to maintain the strength of an automotive seat. When extending the length of the groove-shaped member, it is common to fit two members having the same cross-sectional shape to each other at their end portions and join them by welding.

Further, in order to join two U-shaped cross-sectional members, a structure and a method disclosed in Patent Literatures 1 and 2 have conventionally been known.

CITATION LIST

Patent Literatures

Patent Literature 1: Japanese Unexamined Patent Application Publication No. 2008-296246
Patent Literature 2: Japanese Unexamined Patent Application Publication No. 2005-088077

SUMMARY OF THE INVENTION

Technical Problem

However, in such a conventional joint structure, the following disadvantages have occurred. That is, in joining plate materials together in a case of welding by welding, thermal strain occurs in the welded portions. Further, it is not possible to join different kinds of materials.

On the other hand, in a method of embossing a metal plate disclosed in Patent Literature 1, before embossing, a stacked plate is superposed on the surface of a metal plate on the side that is in contact with a die, and then, with the stacked plate superposed on the surface of the metal plate, ironing is performed on portions which will become vertical wall portions of a plurality of circular protrusions, thereby completing the plurality of circular protrusions. The joining is performed by the circular protrusions.

Therefore, only by preparing a pair of press metal dies consisting of a punch provided with a plurality of protrusions and a die provided with a plurality of recesses corresponding to the protrusions, embossed products can be obtained even from stainless steel sheets, high tensile steel sheets, or the like.

Furthermore, according to a method of joining plate materials in Patent Literature 2, a plurality of plate materials are joined by driving rivets. At the same time, in the vicinity around the joined portions by the driving rivet, convexo-concave portions in which one of front and back surfaces is depressed and the other surface swells are formed by plastic deformation of the plurality of plate materials.

As a result, even in plate materials constituting a structure to which vibration or a large load acts or a relatively heavy structure, the joining strength such as the strength against rotation or displacement of the plate materials can be significantly improved by a simple and low-cost method. Furthermore, deformation such as distortion of the plate materials due to the joining can be minimized.

However, when these joining methods are applied to joining of U-shaped cross-sectional groove-shaped members, the joining strength has sometimes still been insufficient. Further, end portions of side plates of the groove-shaped member need to be processed by bending in another process.

Accordingly, the inventor has made it possible to simplify the process and increase the working efficiency by performing the joining of the two groove-shaped members and the processing of their end portions in a single step in the joining.

Solution to the Problem

A first aspect of the present invention is a joint structure for groove-shaped members in which a substantially U-shaped cross-sectional first groove-shaped member and second groove-shaped member each including a bottom surface portion and a pair of side surface portions rising from both ends of the bottom surface portion are fitted to each other with the bottom surface portions and the pairs of side surface portions in close contact with each other and are joined, comprising a bottom surface clinched portion formed on the bottom surface portions in fitted portions of the first groove-shaped member and the second groove-shaped member by spot clinching, and a pair of edge folding portions each formed on the pairs of side surface portions in the fitted portions by hemming.

The first groove-shaped member and the second groove-shaped member have a predetermined length, and portions thereof to be joined (for example, end portions in the length direction thereof) are fitted to each other. There are three patterns for the fitted portions: a case where groove-shaped members with the same length are fitted to each other over the entire length, a case where their end portions are fitted to each other and joined, whereby the entire length is extended, and a case where one groove-shaped member is shorter than the other, the shorter member is overlapped with the longer member, and only the overlapped portions are fitted.

Thus, the cross-sectional shapes of the fitted portions are almost the same, and for example, have a bottom surface portion of a predetermined width and a pair of side surface portions where both ends in the width direction of the bottom surface portion rise from the bottom surface at 90° (right angles). In this case, the widths of the bottom surface portions and the heights of the side surface portions are almost the same (except for the plate thicknesses), and the second groove-shaped member is closely fitted inside the first groove-shaped member. In the outer first groove-shaped member, upper ends of the pair of side surface portions are bent inward only at 90° (horizontally) and protrude by a predetermined length. The plate thicknesses of these groove-shaped members are arbitrary, and the materials of these groove-shaped members may be the same or may be different materials. The materials may be iron sheets, steel sheets, aluminum sheets, SUS materials, surface-treated steel sheets, or the like.

Specifically, in a substantially U-shaped cross-sectional first groove-shaped member and second groove-shaped member each including a pair of left and right side surface portions rising perpendicularly to a bottom surface portion having a predetermined width and constituted as a flat surface, from both ends in the width direction of the bottom surface portion, for example, end portions of the first and second groove-shaped members are brought into a fitted state. The fitted state refers to a state in which the bottom surface portions and the pairs of side surface portions at the end portions of the first and second groove-shaped members are in close contact with each other. Cases where groove-shaped members of different lengths are fitted to each other, and groove-shaped members of the same length are fitted to each other over the entire length or are partially fitted to each other are included.

On the bottom surface portions where the first groove-shaped member and the second groove-shaped member are closely overlapped in the fitted portions of the first groove-shaped member and the second groove-shaped member, a bottom surface clinched portion is formed by spot clinching. The bottom surface clinched portion includes forming, for example, a circular hole (concave portion) with a predetermined depth by, for example, pressing a punch outward while applying a predetermined external force from the inside of the fitted portions thereby causing plastic deformation on the portions. The shape of the hole does not matter. The number of holes also does not matter. The bottom surface clinched portion includes forming two clinched holes on a straight line in the extending direction of the groove-shaped members. Furthermore, although the bottom surface clinched portion protrudes toward the outside of the groove-shaped members, it can take on a shape that protrudes inward of the groove-shaped members by providing a protrusion on the die.

Further, in the fitted portions, left side surface portions and right side surface portions closely overlapped at the pairs of left and right side surface portions are each formed with an edge folding portion by hemming. The hemming is also referred to as hemming bending and is a processing in which upper portions of the side surfaces are folded back 180° and crushed flat at the side surfaces. It is also referred to as crush bending or edge folding. The left and right edge folding portions may be located at the same position or different positions in the length direction of the groove-shaped members. Further, the left and right edge folding portions may be each formed at one place or at a plurality of places.

For example, the joint structure for the groove-shaped members is such that three bottom surface clinched portions are formed and an arrangement thereof is triangular. By having the triangular arrangement on the bottom surface portions, vertical and horizontal displacements between the surfaces can be prevented. The joining strength becomes higher than the case of, for example, a single clinched portion.

A second aspect of the present invention is the joint structure for the groove-shaped members according to the first aspect, wherein a pair of side surface clinched portions are correspondingly formed at the pair of edge folding portions by spot clinching.

At the pair of left and right edge folding portions, side surface clinched portions (such as concave portions of a predetermined shape) are formed by spot clinching in order to ensure the joining of the side surface portions together. For example, a plurality of side surface clinched portions may be formed spaced apart from each other in the extending direction.

The three bottom surface clinched portions by spot clinching which are, for example, arranged in a triangle on the bottom surface portions can reliably ensure the joining not only in the length direction of the groove-shaped members but also in the width direction thereof. The joining strength between the surfaces is increased.

A third aspect of the present invention is the joint structure for the groove-shaped members according to the first or second aspect, wherein the pair of side surface portions are each bent at an obtuse angle with respect to the bottom surface portion.

In the cross-sectional shape of the first groove-shaped member and the second groove-shaped member, the angle between the side surface portion and the bottom surface portion is not limited to a right angle, and may be an obtuse angle. As a result, the obtuse angle cross section has a larger section modulus with respect to a bending moment due to an external force in the vertical direction than the right angle cross section. That is, it becomes more resistant to vertical bending.

A fourth aspect of the present invention is a joining method for groove-shaped members, comprising a first step of preparing a substantially U-shaped cross-sectional first groove-shaped member and second groove-shaped member each including a bottom surface portion and a pair of side surface portions rising from both ends of the bottom surface portion, a second step of fitting the second groove-shaped member to the first groove-shaped member, thereby bringing the bottom surface portions and the pairs of side surface portions in fitted portions of the first groove-shaped member and the second groove-shaped member into close contact with each other, and a third step of forming a bottom surface clinched portion on the bottom surface portions in the fitted portions of the first groove-shaped member and the second groove-shaped member by spot clinching, and at the same time, forming a pair of edge folding portions on the pairs of side surface portions by hemming.

The substantially U-shaped cross-sectional first groove-shaped member and second groove-shaped member having the bottom surface portion and the pair of left and right side surface portions are prepared. All or part of the first groove-shaped member and the second groove-shaped member are brought into a fitted state in which the bottom surface portions and the side surface portions are in close contact with each other. Spot clinching is performed on the bottom surface portions in the fitted portions, and at the same time, hemming bending is performed on the pairs of side surface portions. Then, the first groove-shaped member and the second groove-shaped member are joined.

Specifically, first, a substantially U-shaped cross-sectional first groove-shaped member and second groove-shaped member consisting of a bottom surface portion and a pair of side surface portions are prepared.

Next, the first groove-shaped member and the second groove-shaped member both have the same U-shaped cross section (including a substantially U-shape cross section), and all or part of them, for example, end portions (opposing end portions) in the length direction thereof are fitted to each other, and then, in the fitted portions (overlapped portions), spot clinching is performed on the bottom surface portions and hemming bending is performed on the pairs of left and right side surface portions at the same time.

These kinds of processing can be performed simultaneously (in one stroke) by forming a protrusion and a recess of predetermined shapes in a punch and a die in a pressing machine and pressing the groove-shaped members (fitted portions), which are workpieces.

A plurality of bottom surface clinched portions can be formed by spot clinching. Three bottom surface clinched portions which are, for example, arranged in a triangle on the bottom surface portions can be formed. In this case, the joining not only in the length direction of the groove-shaped members but also in the width direction thereof can be reliably performed. The joining strength between the surfaces is increased.

A fifth aspect of the present invention is the joining method for the groove-shaped members according to the fourth aspect, wherein a pair of side surface clinched portions by spot clinching are correspondingly formed on the pair of edge folding portions in the third step.

In the third step, hemming bending is performed on edge portions of the pairs of left and right side surface portions at the same time as the spot clinching of the bottom surface portions. As a result, the edge portions are improved in the strength thereof and improved in the safety and convenience in working and handling.

Furthermore, the side surface clinched portions by spot clinching are formed on the pair of left and right edge folding portions at the same time as the hemming bending. As a result, in the single third step, the side surface clinched portions can be formed on the edge folding portions at the same time as the hemming on the edge folding portions.

The pair of side surface clinched portions formed on the pairs of side surface portions also have a role of reinforcing the left and right side surface portions and preventing displacement.

Advantageous Effects of the Invention

According to the present invention, the strength (bending, compression, and tensile) of the joined portions can be increased in the joint structure for the groove-shaped members. Thus, the groove-shaped members can be extended to a desired length. Alternatively, the groove-shaped members can be easily overlapped double. Further, different kinds of materials can be joined together. For example, a steel sheet and an aluminum plate, or plate materials of different thicknesses.

Furthermore, welded portions can be eliminated at the time of joining. Thus, no thermal strain occurs in the joined portions. No secondary processing for removing the strain is required.

Further, the second clinched portions can further increase the joining strength at each of the pairs of side surface portions.

The angle formed by the bottom surface portion and the side surface portion is not limited to a right angle. By making it an obtuse angle, the joining strength (such as bending strength) can be further increased. This is because the section modulus becomes larger.

Furthermore, the clinched portions formed on the bottom surface portions are arranged at three vertices of the triangle, whereby the positioning of the groove-shaped members on the plane can be made firm.

DESCRIPTION OF EMBODIMENTS

Hereinafter, an embodiment of a joint structure for groove-shaped members and a joining method for the same according to the present invention will be described.

FIG. 1 to FIG. 4 are diagrams for explaining a joint structure for groove-shaped members and a joining method for the same according to a first embodiment.

As shown in these figures, a first groove-shaped member 11 and a second groove-shaped member 21 having almost the same substantially U-shaped cross section have end portions 11A, 21A in the length direction thereof fitted to each other. That is, the first groove-shaped member 11 and the second groove-shaped member 21 are each a rail-shaped long material, for example, made by bending a SUS plate to have a substantially U-shaped cross section, and are fitted to each other with one end portion 11A in the length direction of the first groove-shaped member 11 as an outer material and the end portion (end portion on the opposite side) 21A in the length direction of the second groove-shaped member 21 as an inner material. The length of the fitted portions is arbitrary.

That is, the first groove-shaped member 11 has a flat bottom surface portion 12 of a predetermined width, a pair of left and right side surface portions 13A, 13B rising at obtuse angles from both end portions in the width direction of the bottom surface portion 12, and overhanging pieces 14A, 14B (which are opposed to each other at a predetermined interval) formed respectively by bending upper ends of the side surface portions 13A, 13B inward at substantially right angles. The overhanging pieces 14A, 14B overhang facing each other, and a predetermined gap is formed between overhanging tips thereof, and the upper part of the bottom surface portion 12 is opened.

Similarly, the second groove-shaped member 21 is configured to have a bottom surface portion 22, a pair of left and right side surface portions 23A, 23B, and a pair of left and right overhanging pieces 24A, 24B.

In the fitted portions 11A, 21A, the flat bottom surface portions 12, 22 are in close contact with each other, and the flat left side surface portions 13A, 23A, and the flat right side surface portions 13B, 23B are also in close contact with each other. In this case, the inner bottom surface portion 22 has a width smaller (shorter) than the outer (lower) bottom surface portion 12 by the plate thicknesses of the side surface portions 13A, 13B. At the same time, the height of the side surface portions 13A, 13B is also higher (longer) than that of the side surface portions 23A, 23B in close contact therewith by the plate thickness. The overhanging length of the overhanging pieces 14A, 14B is configured to be almost the same as that of the overhanging pieces 24A, 24B.

In these figures, in the fitted portions 11A, 21A, two clinched hole portions 31, 32, which are bottom surface clinched portions, are formed in their overlapped bottom surface portions 12, 22 by spot clinching. The hole diameter and hole depth of the two clinched hole portions 31, 32 are arbitrary, and their formation positions are spaced apart from each other at a predetermined interval at a substantially middle position (central position) of the bottom surface portion plates.

Further, the side surface portion 23A overlapped with the side surface portion 13A and the side surface portion 23B in close contact with the side surface portion 13B have hemming bending portions (edge folding portions) 33, 34 formed correspondingly by bending the overhanging pieces 14A, 24A and the overhanging pieces 14B, 24B inward by hemming bending in the fitted portions 11A, 21A. That is, the plate materials are folded back 180° and crushed flat at the left and right side surface portions in the fitted portions.

Furthermore, hemming and clinching are performed on each of the hemming bending portions (edge folding portions) 33, 34. That is, at the central position in the length direction of the fitted portions, a pair of left and right side surface clinched portions (long groove shaped) 35, 36 are provided on the inner surface side. The side surface clinched portions 35, 36 have a groove shape extending vertically with a constant width, and the inner side is concave and the outer side is convex.

A joining method for groove-shaped members according to an embodiment of the present invention is as follows.

First, in a first step, a substantially U-shaped cross-sectional first groove-shaped member and second groove-shaped member each including a bottom surface portion and a pair of side surface portions rising from both ends of the bottom surface portion are prepared.

Next, in a second step, end portions of the first groove-shaped member and the second groove-shaped member are fitted to each other. At this time, the bottom surface portions, and the pairs of left and right side surface portions are brought into close contact with each other.

Furthermore, in a third step, spot clinching is performed on the bottom surface portions and hemming bending is performed on the left and right side surface portions (edge folding portions are each formed on the left and right side surface portions) at the same time in the closely fitted portions. As a result, the first groove-shaped member is firmly joined with the second groove-shaped member. Further, there is no occurrence of thermal strain in the members due to non-welded joining.

Specifically, the first groove-shaped member and the second groove-shaped member both have the same U-shaped cross section (including a substantially U-shaped cross section), and all or part of them, for example, end portions (opposing end portions) in the length direction thereof are fitted to each other, and then, in the fitted portions (overlapped portions), spot clinching is performed on the bottom surface portions and hemming bending is performed on the pairs of left and right side surface portions at the same time.

These kinds of processing can be performed simultaneously (in one stroke) by forming a protrusion and a recess of predetermined shapes in a punch and a die in a pressing machine and pressing the groove-shaped members (fitted portions), which are workpieces.

Three bottom surface clinched portions which are, for example, arranged in a triangle on the bottom surface portions can be formed. In this case, the joining not only in the length direction of the groove-shaped members but also in the width direction thereof can be reliably performed. The joining strength between the surfaces is increased.

In the third step, a pair of side surface clinched portions are correspondingly formed at the pair of edge folding portions by spot clinching.

In the third step, hemming bending is performed on edge portions of the pairs of left and right side surface portions at the same time as the spot clinching of the bottom surface portions. As a result, the edge portions are improved in the strength thereof and improved in the safety and convenience in working and handling.

Furthermore, the pair of side surface clinched portions formed on the pairs of side surface portions also have a role of reinforcing the left and right side surface portions and preventing displacement.

The spot clinching is such that a punch is pressed into overlapped two plates (plate members) as if penetrating through holes, causing the two plates to be plastically deformed and joined. The spot clinching is a method of joining by applying a small amount of processing pressure in a hole shape. The clinched portion is convex toward the back side from the bottom surface portions, but the reverse is also possible.

Due to processing in the punch and the die by using the press metal dies, multiple processing at multiple places become possible in one stroke by using predetermined metal dies. This allows for high-strength joining, and strong joining can be obtained without anisotropy in strength and being affected by the direction of force. Due to the joining by non-heating processing, joining of a combination of members unsuitable for welding and joining of a combination of different kinds of materials are allowed.

The clinched portion specifically means a concave portion or a convex portion. The concave portion indicates a case (a convex portion) where the cylindrical protruding portion (convex portion) formed by spot clinching protrudes inward and a case (a concave portion) where it protrudes outward, in the fitted portions where the two members are overlapped with each other.

In the joining method for the groove-shaped members, spot clinching and hemming folding can be performed at the same time, that is, in one operation, such as lowering operation of the press metal dies.

Figure 1:
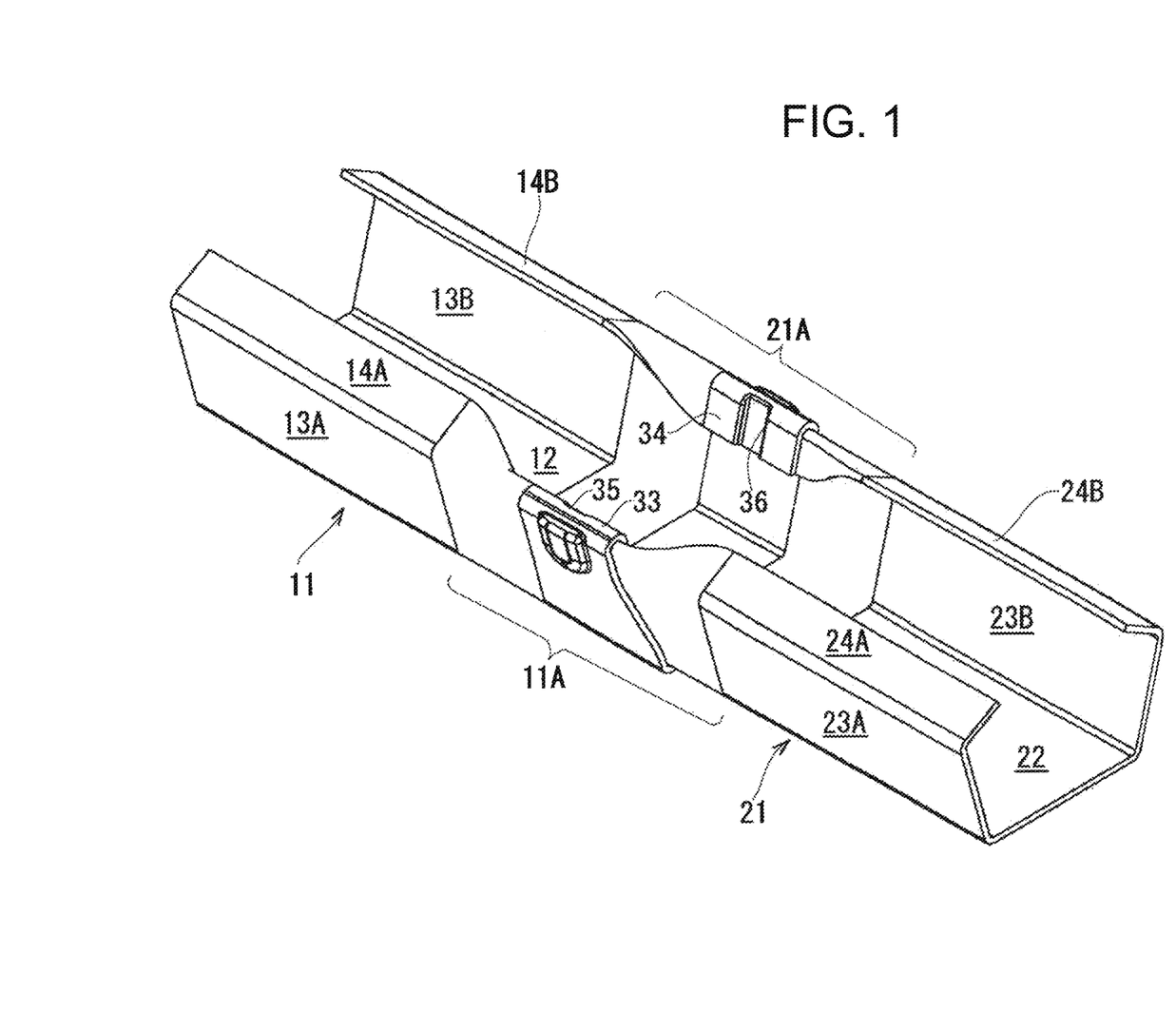
FIG. 1 is a perspective view showing a joint structure for groove-shaped members according to a first embodiment of the present invention.
Figure 2:
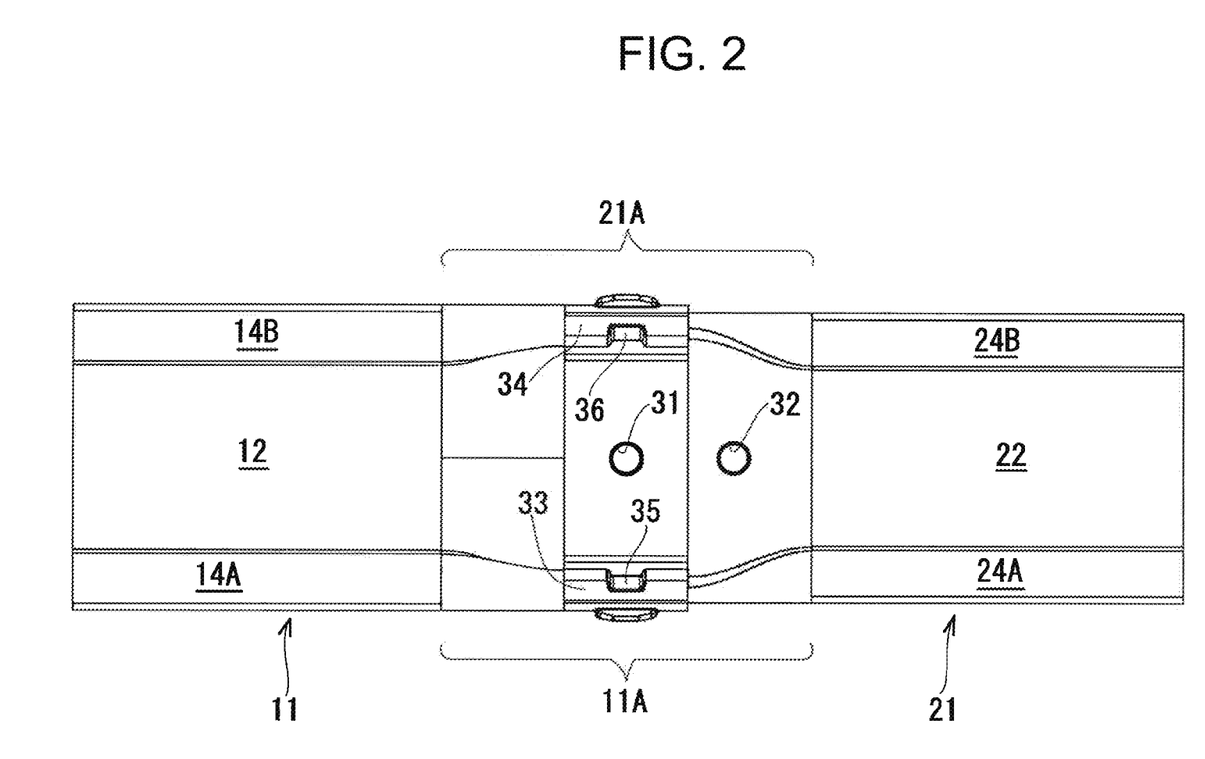
FIG. 2 is a plan view showing the joint structure for the groove-shaped members according to the first embodiment of the present invention.
Figure 3:
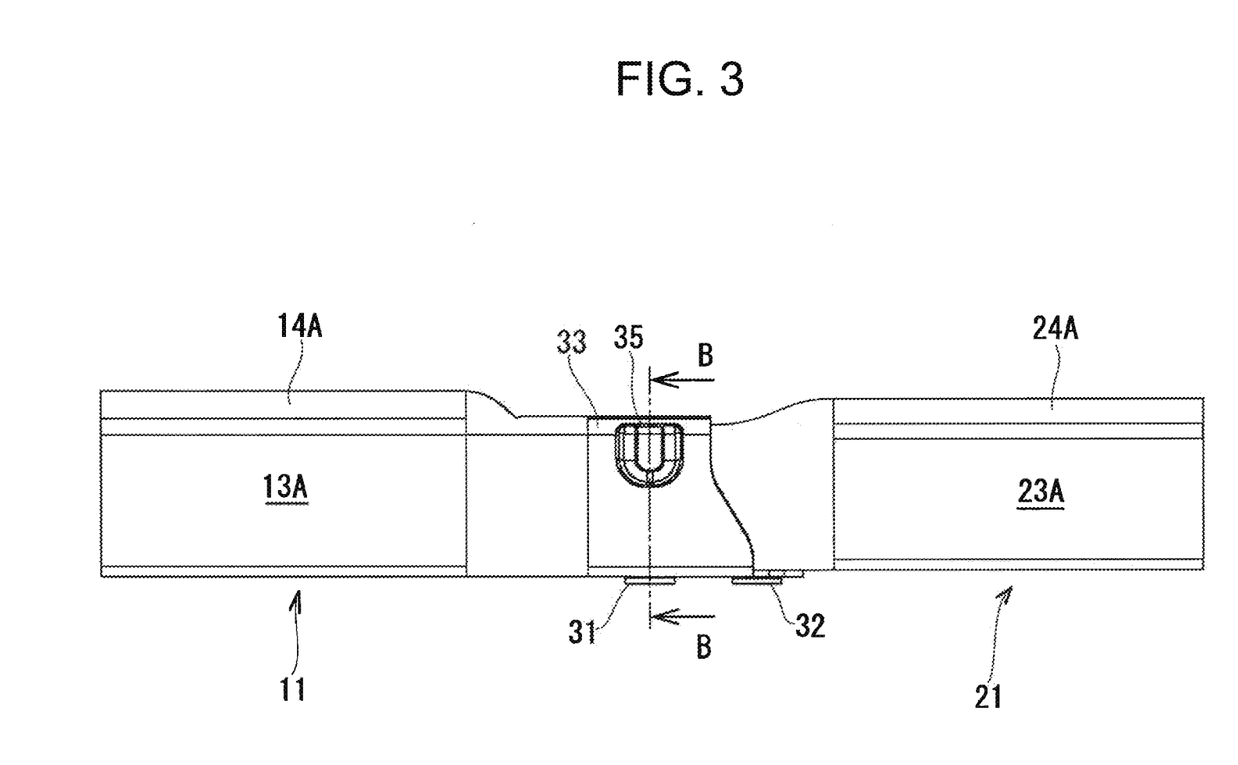
FIG. 3 is a side view showing the joint structure for the groove-shaped members according to the first embodiment of the present invention.
Figure 4:
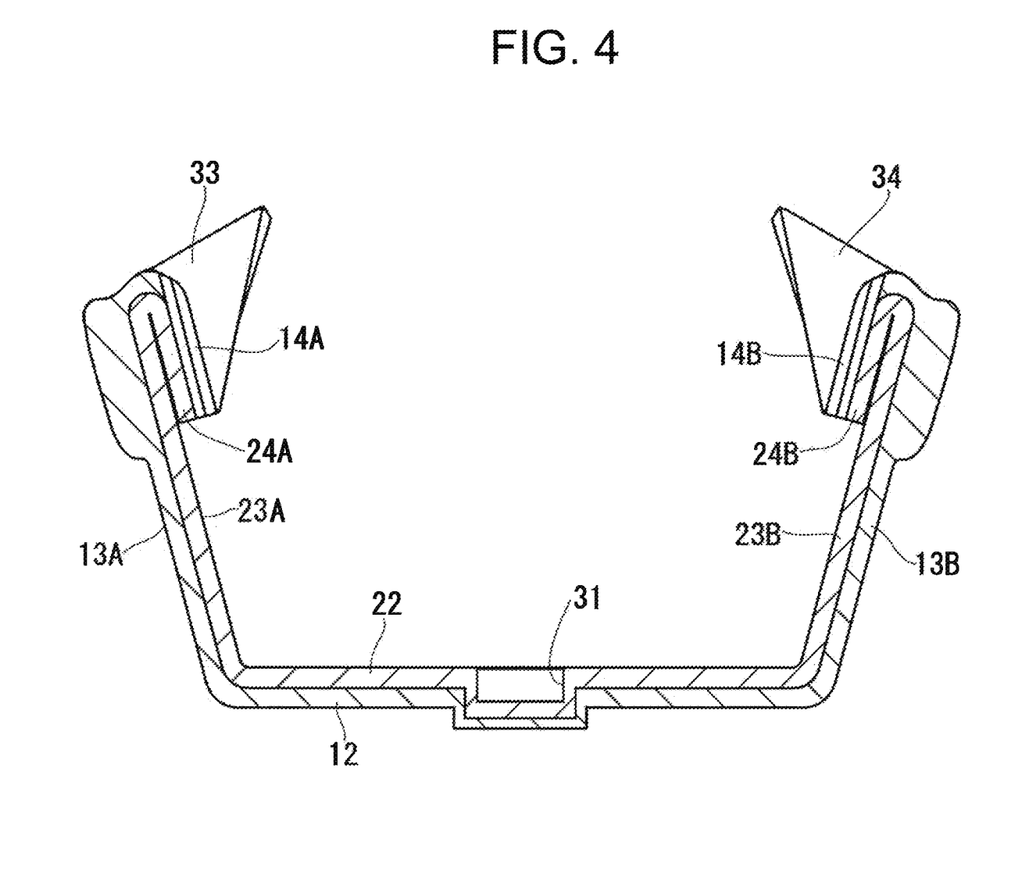
FIG. 4 is a cross-sectional view taken along line B-B in FIG. 3.
Figure 5:
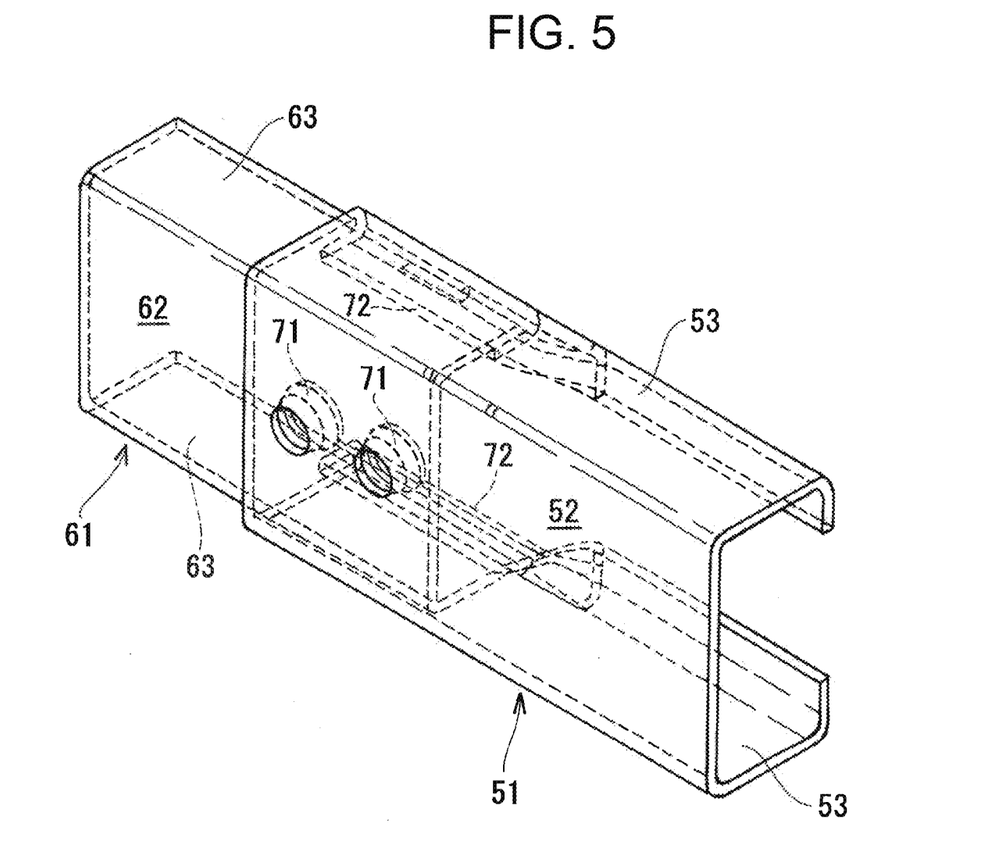
FIG. 5 is a perspective view showing a joint structure for groove-shaped members according to a second embodiment of the present invention.
Figure 6:
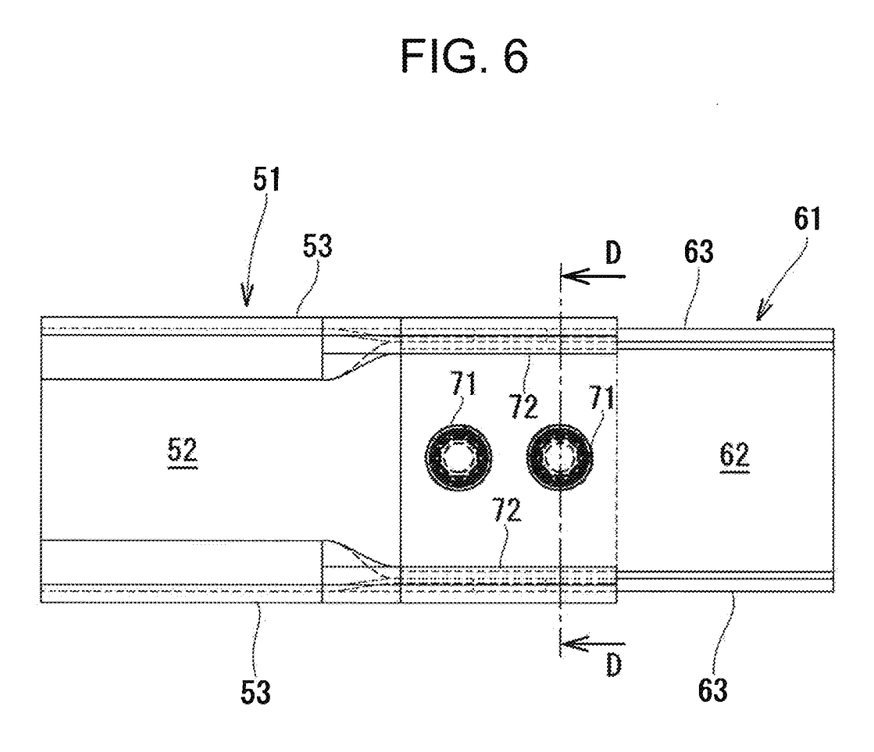
FIG. 6 is a plan view showing the joint structure for the groove-shaped members according to the second embodiment of the present invention.
Figure 7:
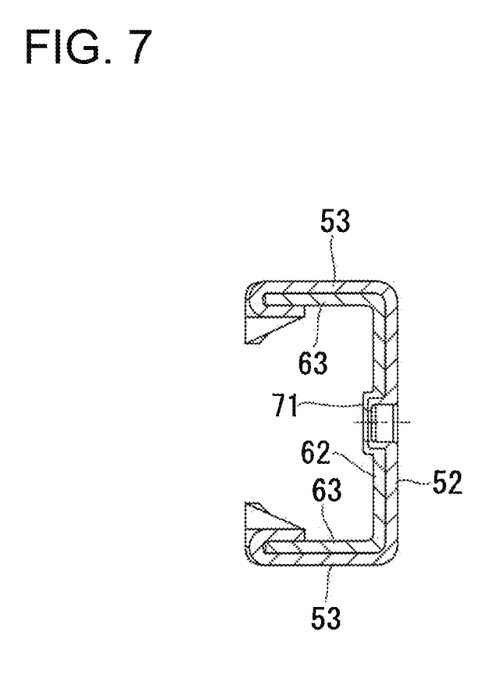
FIG. 7 is a cross-sectional view taken along line D-D in FIG. 6.

Next, a second embodiment of the present invention will be described with reference to FIG. 5 to FIG. 7. A first groove-shaped member 51 and a second groove-shaped member 61 used in this embodiment have substantially the same U-shaped cross section. The groove-shaped members 51, 61 are each composed of a bottom surface portion 52, 62, and a pair of side surface portions 53, 63 rising at right angles from both ends in the width direction of the bottom surface portion 52, 62. In this case, the manufacturing of the first groove-shaped member 51 and the second groove-shaped member 61 is simplified, and they can be easily assembled without displacement even in the fitting.

Specifically, at one end portion in the length direction of the long first groove-shaped member 51, one end portion (opposing end portion) of the long second groove-shaped member 61 is closely fitted inside and fixed.

The first groove-shaped member 51 and the second groove-shaped member 61 each have a substantially U-shaped cross section. That is, the first groove-shaped member 51 and the second groove-shaped member 61 each have an upper side opened and include a bottom surface portion 52, 62 of a predetermined width and a pair of side surface portions 53, 63 rising from both ends of the bottom surface portion.

The plate width of the bottom surface portion 52 of the first groove-shaped member 51 is substantially the same as that of the bottom surface portion 62 of the second groove-shaped member 61. In practice, twice the plate thickness of the second groove-shaped member 61+the width of the bottom surface portion 62=the width of the bottom surface portion 52 of the first groove-shaped member 51.

The substantially U-shaped cross-sectional first and second groove-shaped members 51, 61 are fitted together with the bottom surface portions 52, 62 and the pairs of side surface portions 53, 63 in close contact with each other at the end portions in the extending direction of the groove-shaped members and these are joined.

Concave portions (bottom surface clinched portions) 71 are formed on the bottom surface portions 52, 62 (closely overlapped) in the fitted portions of the first and second groove-shaped members 51, 61 by spot clinching, and a pair of edge folding portions 72 are formed on the pairs of side surface portions 53, 63 in the fitted portions by hemming.

The groove-shaped member is formed by forming a long metal plate material having a predetermined length, a predetermined width, and a predetermined thickness into a U-shaped cross section. That is, the bottom surface portions 52, 62 of a predetermined width, the pairs of side surface portions 53, 63 (right side surface portions and left side surface portions) rising from both ends in the width direction of the bottom surface portions at an angle of approximately 90°, and the rising height are the same on the left and right. The pair of side surface portions 53 located outside in the fitted state have upper end portions bent at 90° toward the inside of the groove and protruding (overhanging pieces).

Hemming bending is applied to both the left side surface plate portions 53, 63 and the right side surface plate portions 53, 63 overlapped double to process them.

A joining method is almost equal to that of the foregoing embodiment. That is, a pair of U-shaped cross-sectional groove-shaped members are prepared, and then, they are fitted to each other (in some cases, their end portions are fitted to each other or when one of the groove-shaped members is shorter, the entire member is fitted), and then, spot clinching on the bottom surface portions and hemming on the side surface portions are performed in one lowering stroke of the press metal dies. The punch may be formed with a protrusion at a predetermined region and the die may be formed with a recess facing the protrusion.

INDUSTRIAL APPLICABILITY

The present invention is useful as a technique for joining groove-shaped members. For example, it can be applied to joining seat frame materials.

REFERENCE SIGNS LIST

11 First groove-shaped member
12 Bottom surface portion
13A, 13B Side surface portion
21 Second groove-shaped member
22 Bottom surface portion
23A, 23B Side surface portion
31, 32 Bottom surface clinched portion
33, 34 Edge folding portion
35, 36 Side surface clinched portion

The invention claimed is:

1. A joint structure for groove-shaped members in which a substantially U-shaped cross-sectional first groove-shaped member and second groove-shaped member each including a bottom surface portion and a pair of side surface portions rising from both ends of the bottom surface portion are fitted to each other with the bottom surface portions and the pairs of side surface portions in close contact with each other and are joined, comprising:
   a bottom surface clinched portion formed on the bottom surface portions in fitted portions of the first groove-shaped member and the second groove-shaped member by spot clinching; and
   a pair of edge folding portions each formed on the pairs of side surface portions in the fitted portions by hemming.

2. The joint structure for the groove-shaped members according to claim 1, wherein a pair of side surface clinched portions are correspondingly formed on the pair of edge folding portions by spot clinching.

3. The joint structure for the groove-shaped members according to claim 2, wherein the pair of side surface portions are each bent at an obtuse angle with respect to the bottom surface portion.

4. The joint structure for the groove-shaped members according to claim 1, wherein the pair of side surface portions are each bent at an obtuse angle with respect to the bottom surface portion.

5. A joining method for groove-shaped members comprising:
   a first step of preparing a substantially U-shaped cross-sectional first groove-shaped member and second groove-shaped member each including a bottom surface portion and a pair of side surface portions rising from both ends of the bottom surface portion;
   a second step of fitting the second groove-shaped member to the first groove-shaped member, thereby bringing the bottom surface portions and the pairs of side surface portions in fitted portions of the first groove-shaped member and the second groove-shaped member into close contact with each other; and
   a third step of forming a bottom surface clinched portion on the bottom surface portions in the fitted portions of the first groove-shaped member and the second groove-shaped member by spot clinching, and at the same time, forming a pair of edge folding portions on the pairs of side surface portions by hemming.

6. The joining method for the groove-shaped members according to claim 5, wherein
   in the third step, a pair of side surface clinched portions are correspondingly formed on the pair of edge folding portions by spot clinching.

* * * * *